United States Patent [19]

Seitz et al.

[11] 4,211,108

[45] Jul. 8, 1980

[54] ELECTRICAL CONNECTOR TEST EQUIPMENT

[75] Inventors: Lamont J. Seitz, Huntington Beach; Geza Fort, Costa Mesa, both of Calif.

[73] Assignee: International Telephone and Telegraph Corporation, New York, N.Y.

[21] Appl. No.: 970,619

[22] Filed: Dec. 18, 1978

[51] Int. Cl.² ............................................. G01N 3/10
[52] U.S. Cl. .............................................. 73/141 AB
[58] Field of Search ............... 73/141 R, 837, 141 AB

[56] References Cited

U.S. PATENT DOCUMENTS

| | | |
|---|---|---|
| 3,110,093 | 11/1963 | Johnson . |
| 3,112,149 | 11/1963 | Bachman .............................. 339/217 |
| 3,129,584 | 4/1964 | Canning et al. .................... 73/141 R |
| 3,485,092 | 12/1969 | Benner ......................... 73/141 AB X |
| 3,564,911 | 2/1971 | Slemmons et al. . |
| 3,605,234 | 9/1971 | Bogursky ............................ 29/203 H |
| 3,676,912 | 7/1972 | Anhelt et al. ....................... 29/203 H |
| 3,777,557 | 12/1973 | Dunlap et al. . |
| 3,945,248 | 3/1976 | West . |
| 4,000,644 | 1/1977 | Oppenheimer . |

Primary Examiner—Jerry W. Myracle
Attorney, Agent, or Firm—Thomas L. Peterson

[57] ABSTRACT

A test station to determine the holding strength of an insulator body on an electrical connector contact retention clip located in a bore in the insulator. The insulator is fixed in position. Then a mandrel with a tool on one end engages the clip and a pneumatically operated piston rod connected to the mandrel pulls on the clip. A lamp may be illuminated or an automatic machine may be stopped when the strain at a selected higher stress exceeds that at a selected lower stress by a predetermined threshold amount.

4 Claims, 3 Drawing Figures

ELECTRICAL CONNECTOR TEST EQUIPMENT

BACKGROUND OF THE INVENTION

This invention relates to means for determining how securely a contact retention clip is fixed in an insulator bore, and more particularly to test gear for an electrial connecter.

PRIOR ART STATEMENT

Bogursky (U.S. Pat. No. 3,605,234) discloses a testing tool which grasps a contact within a clip connector and applies a pulling force to the contact.

Johnson (U.S. Pat. No. 3,110,093), Bachman (U.S. Pat. No. 3,112,149) and the ITT Patent to Anhalt et al. (U.S.Pat. No. 3,676,912) show similar release sleeve mechanisms.

Slemmons et al. (U.S. Pat. No. 3,564,911) and West (U.S. Pat. No. 3,945,248) suggest the testing of electrical devices by applying pulling forces.

Dunlap et al. (U.S. Pat. No. 3,777,557) and Oppenheimer (U.S. Pat. No. 4,000,644) disclose testing devices which include displacement and force measuring devices.

SUMMARY OF THE INVENTION

According to the present invention, there is provided apparatus for investigating the resistance to separation of electrical connector parts including an insulator having a bore, and an electrical contact retention clip fixed relative to the insulator inside the bore, said apparatus comprising: releasable means actuable to hold the insulator in a fixed position; means to engage said clip; tension means to pull said engagement means in a direction to urge said clip out of said insulator bore, said tension means including a spring having one end connected with said engagement means; first analog means for producing an electrical output signal as a first predetermined function of the tensile stress on said clip, said spring having its other end connected with said first analog means; and utilization means connected from said first analog means.

In one embodiment of the present invention strain responsive means are employed to sense the displacement of the clip.

BRIEF DESCRIPTION OF THE DRAWINGS:

In the accompanying drawings, which illustrate exemplary embodiments of the present invention.

DESCRIPTION OF THE PREFERRED EMBODIMENTS

Figure 1:
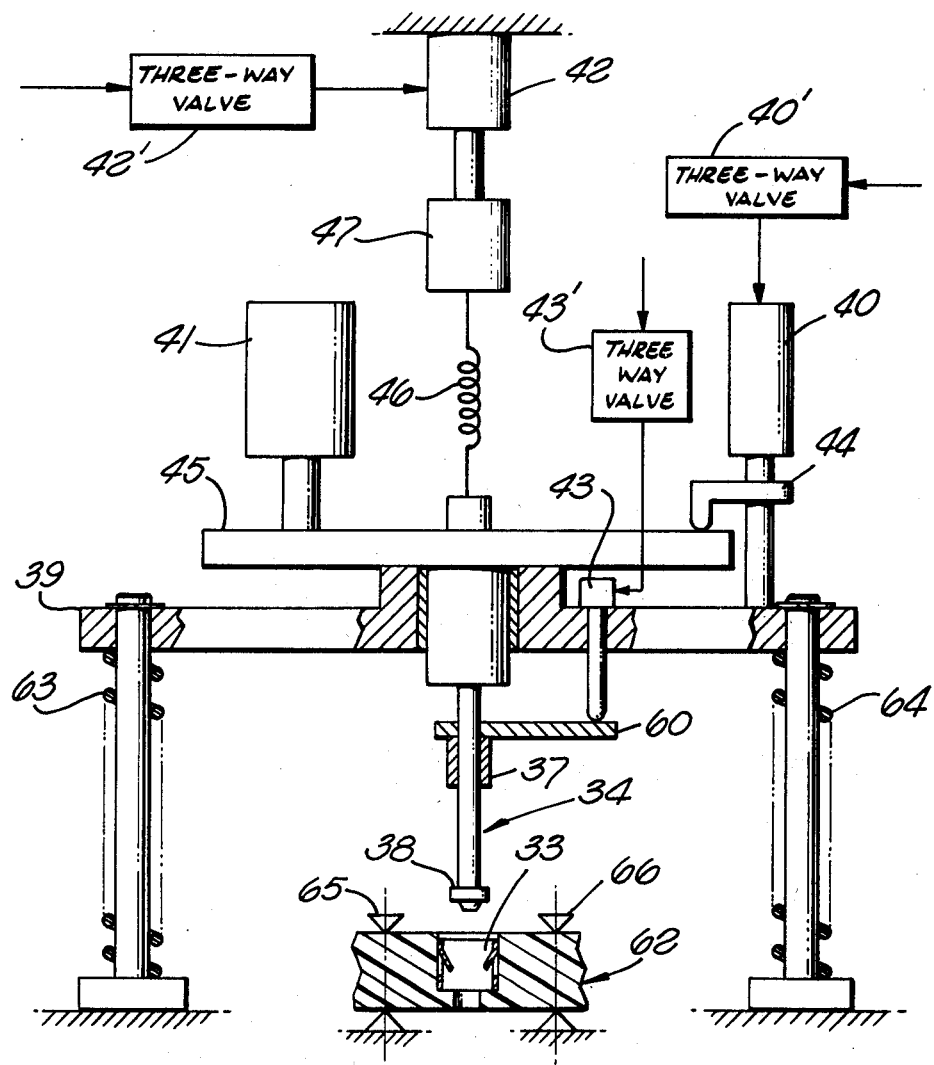
FIG. 1 is a diagrammatic view of apparatus constructed in accordance with the present invention.

The contact retention assembly disclosed in U.S. Pat. No. 3,494,998 issued Feb. 10, 1970, has a construction similar to that illustrated at and around clip 33 in FIG. 1.

The clip, when installed in the insulator, has the cross section shown at 33.

The pull-out inspection system inserts a test probe 34 into engagement with tines 35 and 36 (FIG. 2) and applies a controlled withdrawal force. The force is continuously monitored and, at a preset value, causes a mechanical position measurement to be taken. The force continues to increase until a second preset value is reached. The mechanical position is again measured and the difference in position between the first and second preset forces is evaluated to determine the security of installation of the clip. If the mechanical motion exceeds a preset limit, electrical relay signals are available which can be used to stop the inspection and signal an alarm. After this part of the inspection is complete, the withdrawal force is removed and a release sleeve 37 is moved down to release the tines 35 and 36 from the probe 34 and the probe 34 then is withdrawn.

Sleeve 37 has the same diameter or is slightly larger in diameter than the diameter of a probe shoulder 38. This allows the probe 34 to be withdrawn from tines 35 and 36 by first releasing any upward withdrawal force on the probe 34 and then moving release sleeve 37 down the probe 34 until the bottom of sleeve 37 rests on shoulder 38. This pushes tines 35 and 36 back and releases the probe 34 which can then be withdrawn.

In the embodiment of the present invention described herein, the motions are derived from extensions and restractions of pneumatic cylinders. This provides a linear motion which is needed and allows easy control of force and speed. However, other means of motion generation are easily substituted if desired.

FIG. 1 is a view of mechanical components.

An insulator 62 is held down by removable restraining means 65 and 66.

Support structure 39 is movable up and down on slide means. It is driven by a pneumatic cylinder 40, the body of which is fixed. The bodies of a linear differential transformer 41 and pneumatic cylinder 42 are fixed relative to each other. Valves 40', 42' and 43' are provided for cylinders 40, 42 and 43. Cylinder 43 is fixed relative to support structure 39.

Figure 2:
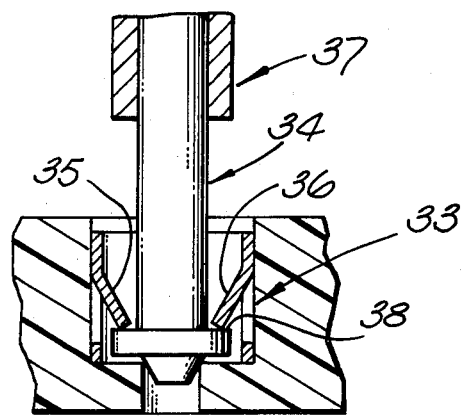
FIG. 2 is an enlarged sectional view of an electrical contact retention clip inside an insulator bore together with engaged tension means.

The piston of air cylinder 40 (not shown) is momentarily extended to move support structure 39 downward and to cause probe 34 to engage tines 35 and 36 (FIG. 2). Probe 34 and disc 45 are moved downward along with support structure 39 by contact with an arm 44 which is fixed relative to the piston of air cylinder 40. The piston of air cylinder 40 is then retracted, leaving probe 34 and disc 45 free to be moved upward.

Air cylinder 42 is then retracted. The piston of air cylinder 42 pulls on a spring 46 through a load cell 47. The spring 46 exerts a constantly increasing upward force on probe 34 pulling against tines 35 and 36 (FIG. 2). Simultaneously, the linear differential transformer 41 in FIG. 1, pressing against the disc 45 of probe 34, provides an electrical output signal proportional to the position of probe 34.

Figure 3:
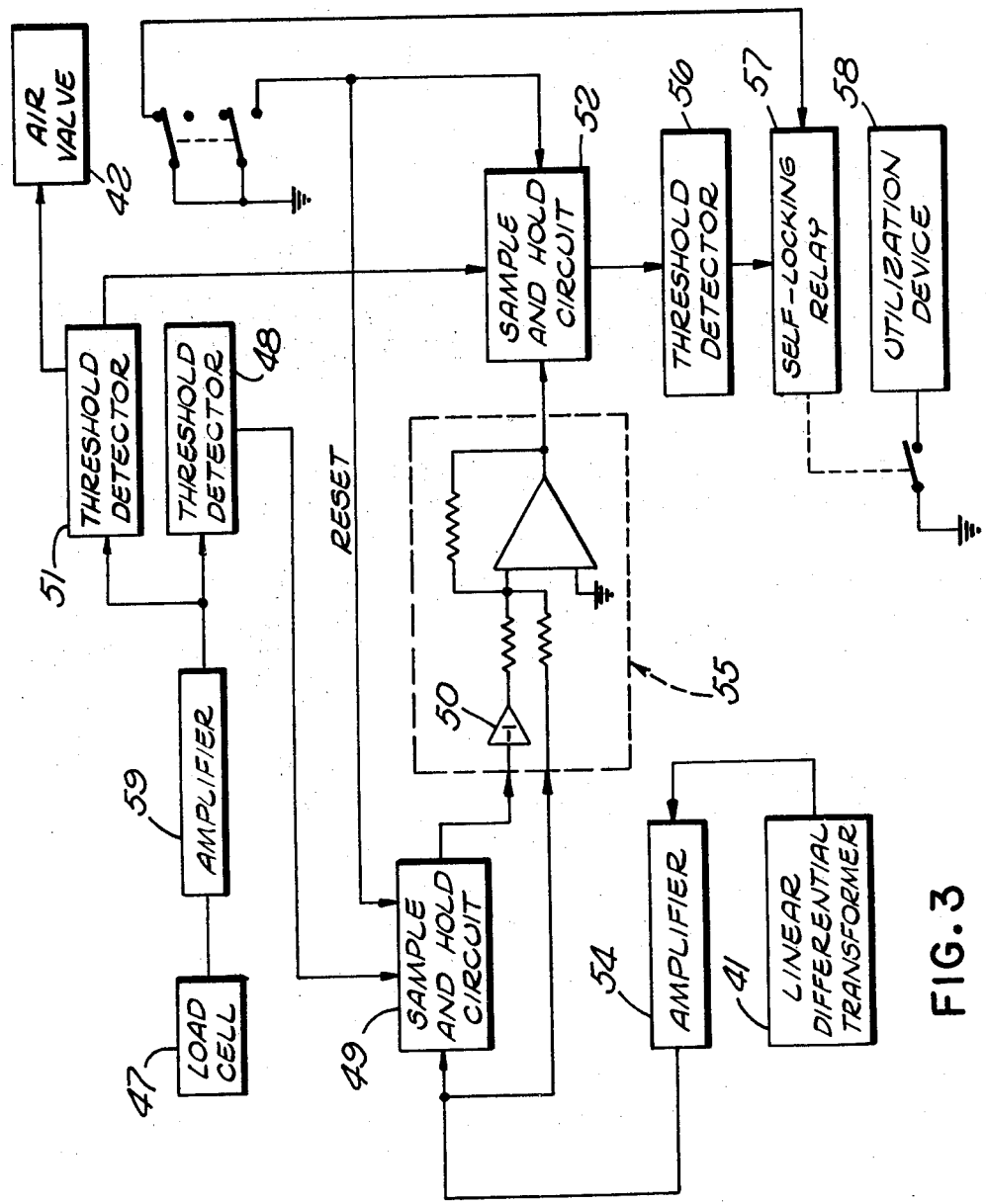
FIG. 3 is a block diagram of electrical apparatus to signal imperfect clip mountings.

Load cell 47 provides an electrical signal to an amplifier 59 (FIG. 3) proportional to the force applied to probe 34. When the force has reached some preset value, which may be 3 pounds for size 22 contacts, a threshold detector 48 causes sample and hold circuit 49 to sample and to hold the value of the linear differential transformer output voltage at a constant value equal to the output voltage of the differential transformer when the applied force equalled the 3 pound preset value.

The force applied to probe 34 continues to increase until it reaches another preset value which may be 10 pounds for size 22 contacts. This causes another threshold detector 51 to actuate another sample and hold circuit 52 and to sample and to hold the output of a subtraction circuit 55 which subtracts (adds a negative output of circuit 49 obtained through inverting amplifier 50) to the output of circuit 49 from that of amplifier 54.

The output of circuit 52 is applied to a threshold detector 56 and relay 57 that operate a utilization device 58 (lamp) that signals a malfunction.

Amplifier 59 is provided to amplify the output of load cell 47. Amplifier 54 is provided to amplify the output of the linear differential transformer 41.

The output of circuit 52 is then proportional to the movement of probe 34 between forces 3 and 10 pounds. Threshold detector 56 can be preset to accept and reject at the desired value of displacement. This may be of the order of 0.005 inch maximum for a good clip.

A signal may be taken from threshold detector 51 to the air valve 42′ for air cylinder 42 which will cause the cylinder piston to extend when the 10-pound force has been reached. This releases the load on tines 35 and 36.

When air cylinder 42 has extended, air cylinder 43 is actuated, moving actuating bar 60 down and thus causing release sleeve 37 to be driven down to the probe shoulder 38, releasing tines 35 and 36. When the tines 35 and 36 are released, springs 63 and 64 (FIG. 1) return the support structure 39 and probe 34 to the disengaged position in FIG. 2.

Air cylinder 43 is then retracted to restore the system to a state of readiness for the next clip test.

What is claimed is:

1. Apparatus for investigating the resistance to separation of electrical connector parts including an insulator havin a bore, and an electrical contact retention clip fixed relative to the insulator inside the bore, said apparatus comprising: releasable means actuable to hold the insulator in a fixed position; means to engage the clip; tension means to pull said engagement means in a direction to urge said clip out of said insulator bore, said tension means including a spring having one end connected with said engagement means; first analog means for producing an electrial output signal as a first predetermined function of the tensile stress on said clip, said spring having its other end connected with said first analog means; utilization means connected from said first analog means; second analog means for producing an electrical output signal which is a function of the tensile strain on said clip; and third analog means connected from said first and second analog means to actuate said utilization means in accordance with a second predetermined function of said signals.

2. The invention as defined in claim 1, wherein said first analog means produces an output signal directly proportional to said stress, said second analog means producing an output signal directly proportional to said strain, said third means including first and second threshold detectors connected from said first analog means, said first and second threshold detectors having first and second outputs, respectively, a first sample and hold circuit, an analog subtractor and a second sample and hold circuit connected in succession in that order from said second analog means to said utilization means, said utilization means being connected from the output of said second sample and hold circuit means to reset said first and second sample and hold circuits, said subtractor also being connected from the output of said second analog means to produce an output signal directly proportional to the difference between the output of said second analog means and the output of said first sample and hold circuit, said first threshold detector having a threshold level less than that of said second threshold detector.

3. The invention as defined in claim 2, wherein a third threshold detector is connected between said second sample and hold circuit and said utilization means.

4. Apparatus for investigating the resistance to separation of electrial connector parts including an insulator having a bore, and an electrical contact retention clip fixed relative to the insulator inside the bore, said apparatus comprising: releasable means actuable to hold the insulator in a fixed position; means to engage the clip; tension means to pull said engagement means in a direction to urge said clip out of said insulator bore, said tension means including a spring having one end connected with said engagement means, analog means for producing an electrical output signal as a predetermined function of the tensile stress on said clip, said spring having its other end connected with said analog means, and motion transmitting means connected to said analog means, and utilization means connected from said analog means.

* * * * *